(No Model.) 2 Sheets—Sheet 2.
F. W. SCHINDLER-JENNY.
ELECTRIC CIGAR LIGHTER.
No. 565,571. Patented Aug. 11, 1896.
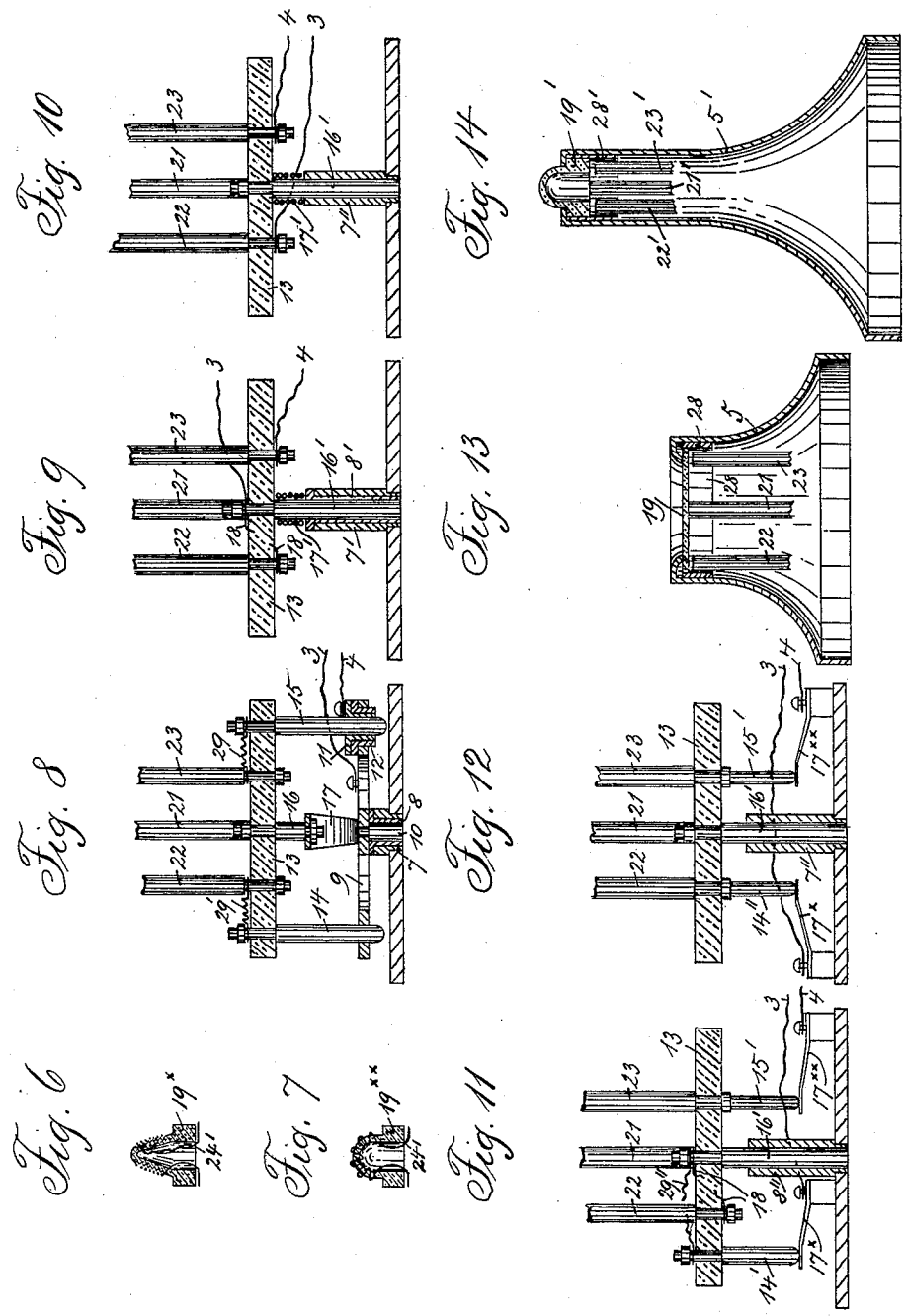

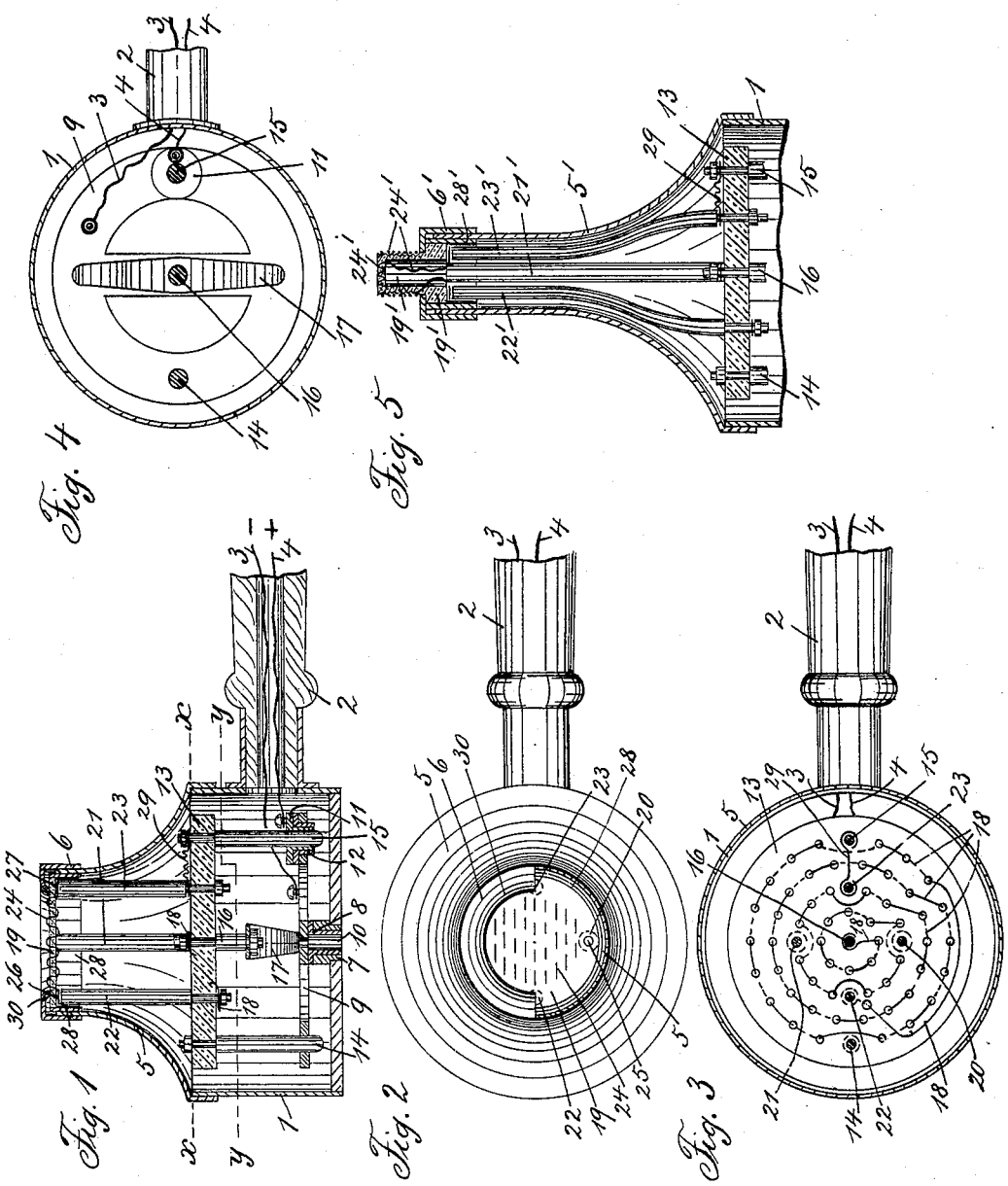

UNITED STATES PATENT OFFICE.

FRIEDRICH WILHELM SCHINDLER-JENNY, OF KENNELBACH, AUSTRIA-HUNGARY.

ELECTRIC CIGAR-LIGHTER.

SPECIFICATION forming part of Letters Patent No. 565,571, dated August 11, 1896.

Application filed October 2, 1895. Serial No. 564,442. (No model.)

*To all whom it may concern:*

Be it known that I, FRIEDRICH WILHELM SCHINDLER-JENNY, a citizen of Switzerland, residing at Kennelbach, near Bregenz, Austria-Hungary, have invented new and useful Improvements in Electric Lighters for Cigars and Pipes, of which the following is a specification.

My invention relates to improvements in electric lighters in which a glow-wire is placed in a casing, or a glow-wire and a resistance-wire of suitable length are both placed in the same casing; and the object of my improvement is to provide means by which the parts constituting the apparatus are loosely connected to the casing and to each other and yet firmly held together, so that in case of exigency the apparatus may be easily separated, the glowing, resistance, and connecting wires being likewise loosely connected and easily brought together again. I attain this object by the means illustrated in the accompanying drawings, in which—

Figure 1 is a vertical section of one form of my apparatus when containing a glow-wire and a resistance-wire in the same casing; Fig. 2, a top view thereof, the upper cover partially cut away; Fig. 3, a horizontal section through line $x$ $x$, and Fig. 4 a similar section through line $y$ $y$, of Fig. 1. Fig. 5 is a vertical section of the upper part of a modification of Fig. 1 which I prefer for pipe-lighting purposes. Figs. 6 and 7 show longitudinal sections of modified forms of the glow-wire carrier of Fig. 5. Fig. 8 is a modified form of my invention corresponding to Fig. 1 and showing the modifications to be made when the apparatus contains only a glow-wire, the resistance-wire being placed out of the casing. Figs. 9 to 12 show other modifications of my invention corresponding to Fig. 1, in which Figs. 9 and 11 refer to an apparatus containing a glow-wire and a resistance in the same casing and Figs. 10 and 12 to an apparatus containing only a glow-wire. Figs. 13 and 14 are modified forms of the cover of my apparatus.

Similar figures refer to similar parts throughout the several views.

Referring first to Figs. 1 to 4, a casing 1 is provided with a handle 2, through which pass the connecting-wires 3 4, insulated against short-circuiting in any well-known manner. A cover 5 is detachably connected to the casing and held at its place by friction, or a screw-thread, or a pin-and-slot connection, or in another convenient manner. Another cover 6 is connected in a similar way to the cover 5. A socket 7 projects from the base-plate of the casing, and a box 8, of insulating material, is inserted into the said socket in order to insulate the supporting-ring 9, which is preferably made of metal and fits with a stud 10 in the box 8.

One of the connecting-wires, say wire 3, is connected to ring 9 by a screw, so as to make contact with the ring, while the other wire, 4, is screwed to a box 11, of metal, insulated from the ring by an insulating-box 12.

Ring 9 is connected to a plate 13, of an insulating material, by connecting-studs 14 15, fixed to plate 13, stud 14 fitting in an opening of the ring and stud 15 in the box 11, referred to heretofore. To the middle of plate 13 is fixed a downward-projecting pin 16, and a flat bent spring 17, screwed to pin 16, bears with its ends on ring 9, thus elastically supporting plate 13 and forming at the same time an electric conductor between the ring 9 and pin 16. Plate 13 carries the resistance-wire 18, Fig. 3, as will be hereinafter described, and serves for supporting another plate 19, of a refractory insulating material, by studs 20 21 22 23, fixed to plate 13. Plate 19 contains the glow-wire 24, the latter passing to and fro through openings of the plate, thus forming a discontinuous igniting-surface at the upper side of the plate 19, as shown in Fig. 2.

Plate 19 is provided with two opposite openings near its edge, which fit on pins projecting from the studs 20 21, as indicated by pin 25 with respect to the stud 20, Fig. 2, the said pins securing plate 19 in such position that the ends 26 27 of the glowing wire 24, which project from the under side of plate 19 and preferably terminate in horizontally-coiled spirals, will just be opposite to the upper ends of the studs 22 23, thus making contact with the said studs.

Plate 19 consisting, preferably, of mica, clay, asbestos, or a similar material of little strength, and being comparatively thin in view of preventing needless absorption of heat, a ring 28 of sheet metal is fixed to studs 20 21, projecting beyond the upper ends of the same a distance equal to the thickness of plate 19, so that the latter is surrounded by the upper projecting part of the ring and thus secured against breakage. Ring 28 is insulated from studs 22 23 either by leaving a space between the ring and the studs, as shown in Figs. 1 and 2, or by interposing, too, an insulating-layer. Thus the electric current, as will be presently described, cannot pass from stud 22 to stud 23 unless running through the glow-wire 24.

The electric circuit is as follows: Studs 15 and 23 are connected by a wire 29. The positive current therefore passes from the connecting-wire 4 to box 11, as heretofore stated, then to stud 15, and by the wire 29 to stud 23, and finally to the glow-wire 24. One end of the resistance-wire 18, Fig. 1, is connected to that end of pin 16 which projects from the upper side of plate 13. It passes to and fro through openings of this plate, as illustrated in Fig. 3, and is connected at its other end to that end of stud 22 which projects from the under side of plate 13, Fig. 1. The negative current will therefore pass from connecting-wire 3 through ring 9, spring 17, pin 16, the resistance-wire 18, stud 22, and finally through the glow-wire 24 to stud 23. The frame, consisting of plate 13 and studs 20 21 22 23, is slightly pressed upward by the spring 17 and guided parallelly by the studs 14 15 and ring 28, which fits in the upper opening of cover 5. By these means plate 19 is pressed against the inwardly-projecting flange 30 of cover 6 and the upper ends of studs 22 23 against the coiled ends 26 27 of the glow-wire, so as to secure a close contact.

Fig. 5 shows a modification of my invention for pipe-igniting purposes, covers 5' 6', studs 20' to 23', and the glow-wire carrier 19' having a convenient form, so that it may be introduced into a pipe-head, the parts of the apparatus not illustrated in Fig. 5 being the same as shown in and described with reference to Figs. 1 to 4. The glow-wire carrier may likewise consist of a plate run through by the glowing wire; but in this case I prefer the form of a hollow cylinder 19', as shown in Fig. 5, open at the bottom and closed at the top. The said cylinder is provided with a shoulder in order to be held at its place by the upper projecting flange of the cover 6', as heretofore described with reference to Figs. 1 and 2, and spirally grooved on its cylindrical surface. The top plate of the cylinder is provided with openings. The glow-wire 24' is coiled on the cylinder 19', filling the said grooves, and then run to and fro through the openings of its top plate. The coiled ends of the wire 24' are in contact with the studs 22' 23', as heretofore described with reference to studs 22 23 of Figs. 1 and 2.

Figs. 6 and 7 show modified forms of the glow-wire carrier represented in Fig. 5, carrier $19^\times$ of Fig. 6 being conical at its upper part and carrying the glow-wire 24' in a spiral groove on its outer surface, as described with reference to Fig. 5, while the carrier $19^{\times\times}$ of Fig. 7 is rounded at its upper end and run through by the glow-wire 24'.

In the modifications represented in Figs. 8 to 12 the side wall of casing 1 and covers 5 6 are omitted by reason of being just the same as described with reference to Fig. 1.

Fig. 8 shows an apparatus which only contains a glow-wire in the casing, the resistance-wire being placed out of the same. There is no difference from Fig. 1, but that plate 13 is deprived of the resistance-wire and a connecting-wire 29' provided between studs 14 and 22, as clearly shown in Fig. 8. The positive current of wire 4 passes the same way as heretofore described, while the negative current of wire 3 passes through ring 9 to stud 14, then through wire 29' to stud 22, and finally through the glow-wire to stud 23.

Figs. 9 to 12 show modifications of my apparatus in which the use of ring 9 is dispensed with. To the middle of plate 13 is fixed a stud 16', by which the frame, consisting of plate 13 and studs 20 21 22 23, is loosely connected to the base-plate of the casing. The slight upward pressure of the frame for the purpose referred to heretofore is brought about by spiral springs 17' of Figs. 9 and 10 and by flat springs $17^\times$ $17^{\times\times}$ of Figs. 11 and 12, fixed to insulating-blocks of the base-plate. In the modifications represented in Figs. 9 and 11 the apparatus is supposed to contain a glow-wire and a resistance-wire in the same casing, but only a glow-wire in the modifications shown in Figs. 10 and 12. The resistance-wire 18 in Figs. 9 and 11 is arranged as described with reference to Figs. 1 and 3. Stud 16' of Fig. 9 fits in an insulating-box 8', inserted into a socket 7' of the base-plate, and the wires 3 4 are connected to studs 16' and 23, respectively. The current of wire 4 passes directly to stud 23, while the current of wire 3 passes from stud 16' to the resistance-wire 18, then through this wire to stud 22, and finally through the glow-wire to stud 23.

In Fig. 10, in which the resistance-wire is supposed to be placed out of the casing, stud 16' fits directly in the socket 7'', insulating not being needed, and the wires 3 4 are directly connected to studs 22 and 23, respectively, so that the current passes directly from stud 22 to stud 23, and vice versa.

The modifications represented in Figs. 11 and 12 differ from those of Figs. 9 and 10 in that the frame, consisting of plate 13 and studs 20 to 23, is loosely connected to the wires 3 and 4, the electric contact being made by the flat springs $17^\times$ and $17^{\times\times}$, which bear against studs 14' and 15' of Fig. 11 and against studs 14'' and 15' of Fig. 12.

The resistance-wire 18 of Fig. 11 is disposed as heretofore described, and a connecting-wire 29'' is provided between studs 16' and 14'. A socket of insulating material is fixed to the base-plate of the casing. The current of wire 4 passes through spring 17×× to stud 15', which forms the continuation of stud 23, and then through the latter to the glow-wire, while the current of wire 3 passes through spring 17× to stud 14' and through wire 29'' to stud 16' and the resistance-wire 18, and then through stud 22 to the glow-wire.

In the modification represented in Fig. 12, in which the resistance-wire is dispensed with again, studs 14'' and 15' form the continuations of studs 22 and 23, respectively, and the currents of wires 3 and 4 pass directly to the said studs and through the glow-wire.

In Figs. 13 and 14 the upper covers 6 and 6' (represented in Figs. 1 and 5) are dispensed with, the flanges overlapping the glow-wire carriers 19 and 19', respectively, and holding them at their places being directly provided to the covers 5 and 5'. It will be obvious that if no resistance-wire is placed in the apparatus plate 13 can be made of metal instead of insulating material, the several studs being insulated by insulating-boxes, as commonly.

Having now fully described my invention, what I claim, and desire to secure by Letters Patent, is—

1. In a cigar or pipe lighting apparatus, the combination of a casing, a frame consisting of a plate or block and supporting-studs fixed thereto, a glow-wire carrier separable from and adapted to lie above and be supported by the said studs, and means for connecting the frame to the casing and keeping the glow-wire carrier in close contact with its supporting-studs, all substantially as set forth and for the purposes specified.

2. In a cigar or pipe lighting apparatus, the combination of a casing, a frame consisting of a plate or block and supporting-studs fixed thereto, a glow-wire carrier separable from and adapted to lie above and be supported by the said studs, a spring or springs elastically supporting the said frame within the casing, and means for keeping the glow-wire carrier in close contact with its supporting-studs, all substantially as set forth and for the purposes specified.

3. In a cigar or pipe lighting apparatus the combination of a casing, a frame consisting of a plate or block and supporting-studs fixed thereto, a resistance-wire placed in the said plate or block, a glow-wire carrier supported by the said studs, and means for connecting the frame to the casing and keeping the glow-wire carrier in close contact with its supporting-studs all substantially as set forth and for the purposes specified.

4. In a cigar or pipe lighting apparatus the combination of a casing, a frame consisting of a plate or block and supporting-studs fixed thereto, a resistance-wire placed in the said plate or block, a glow-wire carrier supported by the said studs, a spring or springs elastically supporting the said frame within the casing and means for keeping the glow-wire carrier in close contact with its supporting-studs, all substantially as set forth and for the purposes specified.

5. In a cigar or pipe lighting apparatus, the combination of a casing, a frame consisting of a plate or block and supporting-studs fixed thereto, a glow-wire carrier separable from and adapted to lie above and be supported by the said studs, a spring or springs elastically supporting the said frame within the casing, and an abutment connected to the casing, to bear against the glow-wire carrier and keep it in close contact with its supporting-studs, all substantially as set forth and for the purposes specified.

6. In a cigar or pipe lighting apparatus, the combination of a casing, a frame consisting of a plate or block and supporting-studs fixed thereto, a resistance-wire placed in the said plate or block, a glow-wire carrier separable from and adapted to lie above and be supported by the said studs, a spring or springs elastically supporting the said frame within the casing, and an abutment connected to the casing, to bear against the glow-wire carrier and keep it in close contact with its supporting-studs, all substantially as set forth and for the purposes specified.

7. In a cigar or pipe lighting apparatus the combination of a casing, a supporting-plate connected to its bottom, a plate or block of insulating material containing a resistance-wire and provided at one side with a supporting-spring to bear against the said supporting-plate and with guide-studs fitting in openings of the latter, and at the other side with supporting-studs, a plate or block of refractory insulating material containing a glow-wire and resting on the said supporting-studs, and means for closely connecting the spring to the supporting-ring and the glow-wire-containing plate or block to its supporting-studs, all substantially as set forth and for the purposes specified.

8. In a cigar or pipe lighting apparatus the combination of a casing, a supporting-plate connected to its bottom, a plate or block of insulating material containing a resistance-wire and provided at one side with a supporting-spring to bear against the said supporting-plate and with guide-studs fitting in openings of the latter, and at the other side with supporting-studs, a plate or block of refractory insulating material containing a glow-wire and resting on the said supporting-studs, a conductor connecting one of the guide-studs to one of the supporting-studs, and means for connecting the resistance-wire to another of the supporting-studs and to the supporting-spring respectively, all substantially as set forth and for the purposes specified.

9. In a cigar or pipe lighting apparatus the combination of a casing, a supporting-plate connected to its bottom, a plate or block of insulating material containing a resistance-wire and provided at one side with a supporting-spring to bear against the said supporting-plate and with guide-studs fitting in openings of the latter, and at the other side with supporting-studs, a plate or block of refractory insulating material containing a glow-wire and resting on the said supporting-studs, and means for insulating one of the guide-wires from the supporting-plate, all substantially as set forth and for the purposes specified.

10. In a cigar or pipe lighting apparatus the combination of a casing, a supporting-plate connected to its bottom, a plate or block of insulating material containing a resistance-wire and provided at one side with a supporting-spring to bear against the said supporting-plate and with guide-studs fitting in openings of the latter, and at the other side with supporting-studs, a hollow block of refractory material, closed at the top and containing a glow-wire coiled on the cylindrical surface of the said block and running alternately to and fro through its top plate, and resting on the said supporting-studs, and means for closely connecting the spring to the supporting-ring and the glow-wire-containing block to its supporting-studs, all substantially as set forth and for the purposes specified.

In witness whereof I have hereunto signed my name in the presence of two subscribing witnesses.

FRIEDRICH WILHELM SCHINDLER-JENNY.

Witnesses:
H. WINTSCH,
H. JENNI.